(12) United States Patent
Lien

(10) Patent No.: US 8,033,512 B2
(45) Date of Patent: Oct. 11, 2011

(54) SELF-SECURE MOUNT FOR TUBULAR OBJECT

(76) Inventor: Chin-Hsiung Lien, El Monte, CA (US)

( * ) Notice: Subject to any disclaimer, the term of this patent is extended or adjusted under 35 U.S.C. 154(b) by 788 days.

(21) Appl. No.: 12/148,005

(22) Filed: Apr. 16, 2008

(65) Prior Publication Data

US 2009/0260196 A1  Oct. 22, 2009

(51) Int. Cl.
*F16L 3/08* (2006.01)
(52) U.S. Cl. ........................ 248/74.5; 248/74.1
(58) Field of Classification Search .................. 248/62, 248/65, 67.7, 67.5, 68.1, 74.1, 74.5; 411/457, 411/508, 920; 174/135
See application file for complete search history.

(56) References Cited

U.S. PATENT DOCUMENTS

| 2,418,539 | A | * | 4/1947 | Anderson | ..................... 248/74.5 |
| 5,054,741 | A | * | 10/1991 | Ismert | ......................... 248/74.5 |
| 5,615,852 | A | * | 4/1997 | Heidorn et al. | ............. 248/74.5 |
| 7,347,401 | B1 | * | 3/2008 | Gretz | ............................ 248/68.1 |
| 7,559,512 | B1 | * | 7/2009 | diGirolamo et al. | ......... 248/74.3 |

* cited by examiner

*Primary Examiner* — Gwendolyn W Baxter
(74) *Attorney, Agent, or Firm* — Raymond Y. Chan; David and Raymond Patent Firm

(57) ABSTRACT

A self-secure mount for a tubular object includes an outer holder and an inner holder. The outer holder includes two spaced apart holding panels and an arc-shaped cornering panel extended between the two holding panels for applying an elastic clipping force between the holding panels. The inner holder includes two spaced apart clipping panels overlapping with each other to define a clipping channel therebetween, wherein two inner edges of the clipping panels are extended towards a closed end of the clipping channel. The two inner edges of the clipping panels are adapted for pressing against an outer surface of the tubular object to retain the tubular object in position, such that when the holding panels are pressed to minimize a distance therebetween, the clipping force of the outer holder is substantially increased towards the inner edges of the clipping panels to hold the tubular object within the cornering panel.

19 Claims, 15 Drawing Sheets

SELF-SECURE MOUNT FOR TUBULAR OBJECT

BACKGROUND OF THE PRESENT INVENTION

1. Field of Invention

The present invention relates to a method and a device of self-secure mount, and more particularly to the mount of tubular objects on walls, e.g. dry wall.

2. Description of Related Arts

For most currently used cable clamps, wire clips, and pipe mounts, there are two major disadvantages. The first issue is lacking of the adjustment for objects with different diameters. Most of the mounts have a fixed diameter. For every specific object with a specific diameter, a specific mount is required to match. Otherwise, if the diameter of the mount is smaller than the diameter of the object, it can not hold the object; if the diameter of the mount is larger than the diameter of the object, the object can not be secured within the mount stably and can be sliding. While there are all different kinds of cables, wires, and tubes, it is difficult to find a mount which is just match. It also cost a lot of resources to fabricate mounts with the whole range of diameters. Some mounts have a rubber inner layer for fastening. But this rubber layer can only supply a small range of adjustment, it can not be applied to objects with large diameters, also the rubber aging will diminish the fastening effect.

Another disadvantage is the mounting process. In most cases, the object needs to be located first, then the mounts can be hooked with the object, and be fixed on the mounting surface. In this way, there is a period of time the object needs to be suspended without the support from the mount. This is inconvenient for the alignment of the object. The present invention will overcome those disadvantages.

SUMMARY OF THE PRESENT INVENTION

An object of the present invention is to provide a self-secure mount to retain a tubular object on a fixture surface wherein the tubular object is secured by the mount without damaging the surface of the tubular object.

An object of the present invention is to provide a self-secure mount which is adapted to retain the tubular object by means of elastic force.

An object of the present invention is to provide a self-secure mount, wherein the manufacturing process of the self-secure mount is relatively simple and is in low cost.

An object of the present invention is to provide a self-secure mount which is made of a flexible thin metal plate being bent in a predetermined configuration such that the self-secure mount provides a simple structural configuration.

An object of the present invention is to provide a self-secure mount which is adapted to tubular objects with a large range of diameters.

Another object of the present invention is to provide a method of making a self-secure mount to fix tubular objects to a surface.

Another object of the present invention is to provide a method of using a self-secure mount to fix tubular objects to a surface.

An object of the present invention is to provide a self-secure mount, wherein no expensive or complicated structure is required to employ in the present invention in order to achieve the above mentioned objects. Therefore, the present invention successfully provides an economic and efficient solution for providing a rigid but flexible configuration for retaining the tubular object in position.

Accordingly, in order to accomplish the above objects, the present invention provides a self-secure mount for tubular object, comprising:

an outer holder, which is made of flexible material, comprising two spaced apart holding panels spacedly overlapping with each other, and an arc-shaped cornering panel integrally extended between the two holding panels for applying an elastic clipping force between the holding panels; and an inner holder, which is also made of flexible material, comprising two spaced apart clipping panels overlapping with each other to define a clipping channel between the holding panels of the outer holder, wherein two outer edges of the clipping panels are integrally extended from two outer edges of the holding panels while two inner edges of the clipping panels are extended towards a closed end of the clipping channel within the cornering panel of the outer holder, wherein the two inner edges of the clipping panels are adapted for pressing against an outer surface of the tubular object to retain the tubular object in position, such that when the holding panels are pressed to minimize a distance therebetween, the clipping force of the outer holder is substantially increased towards the inner edges of the clipping panels to hold the tubular object within the cornering panel.

The present invention further provides a method of manufacturing a self-secure mount, comprising the steps of:

(a) providing an elongated thin metal plate which is divided into four longitudinal sections;

(b) overlappedly and spacedly folding two outer longitudinal sections on two inner longitudinal sections; and (c) overlappedly and spacedly folding the two outer longitudinal sections with each other at a position that the two inner longitudinal sections are overlappedly and spacedly sandwiched between the two outer longitudinal sections to form a clipping channel between the two inner longitudinal sections, wherein the two outer longitudinal sections forms two clipping panels while the two inner longitudinal sections forms two holding panels, wherein when a tubular object is slid into the clipping channel to a closed end thereof, two inner edges of the clipping panels are adapted for pressing against an outer surface of the tubular object to retain the tubular object in position, such that when the holding panels are pressed to minimize a distance therebetween, the clipping force of the holding panels is substantially increased towards the inner edges of the clipping panels to hold the tubular object within the closed end of the clipping channel.

These and other objectives, features, and advantages of the present invention will become apparent from the following detailed description, the accompanying drawings, and the appended claims.

DETAILED DESCRIPTION OF THE PREFERRED EMBODIMENT

Figure 1:
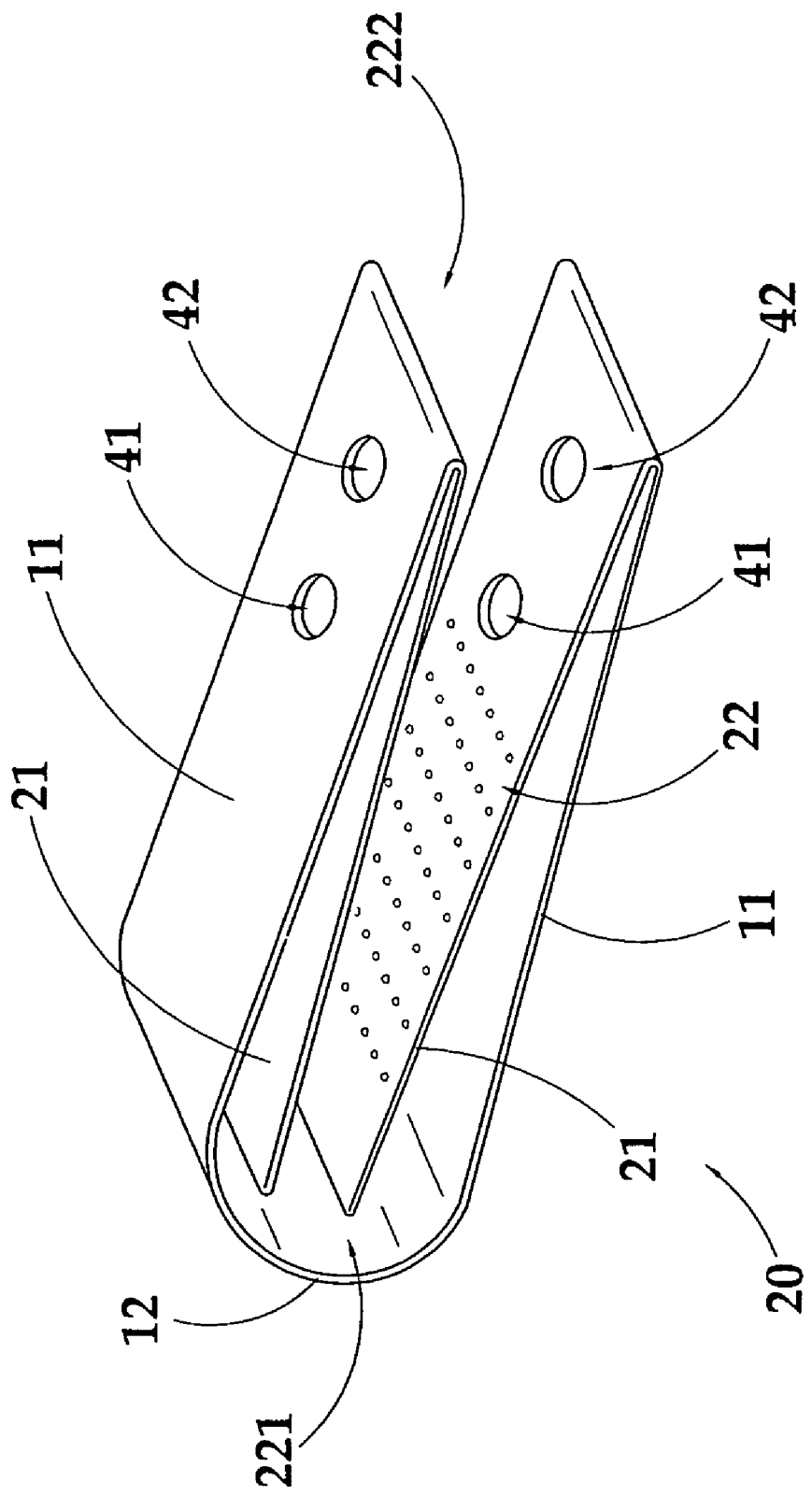
FIG. 1 is a perspective view of a self-secure mount for a tubular object according to a preferred embodiment of the present invention.
Figure 2:
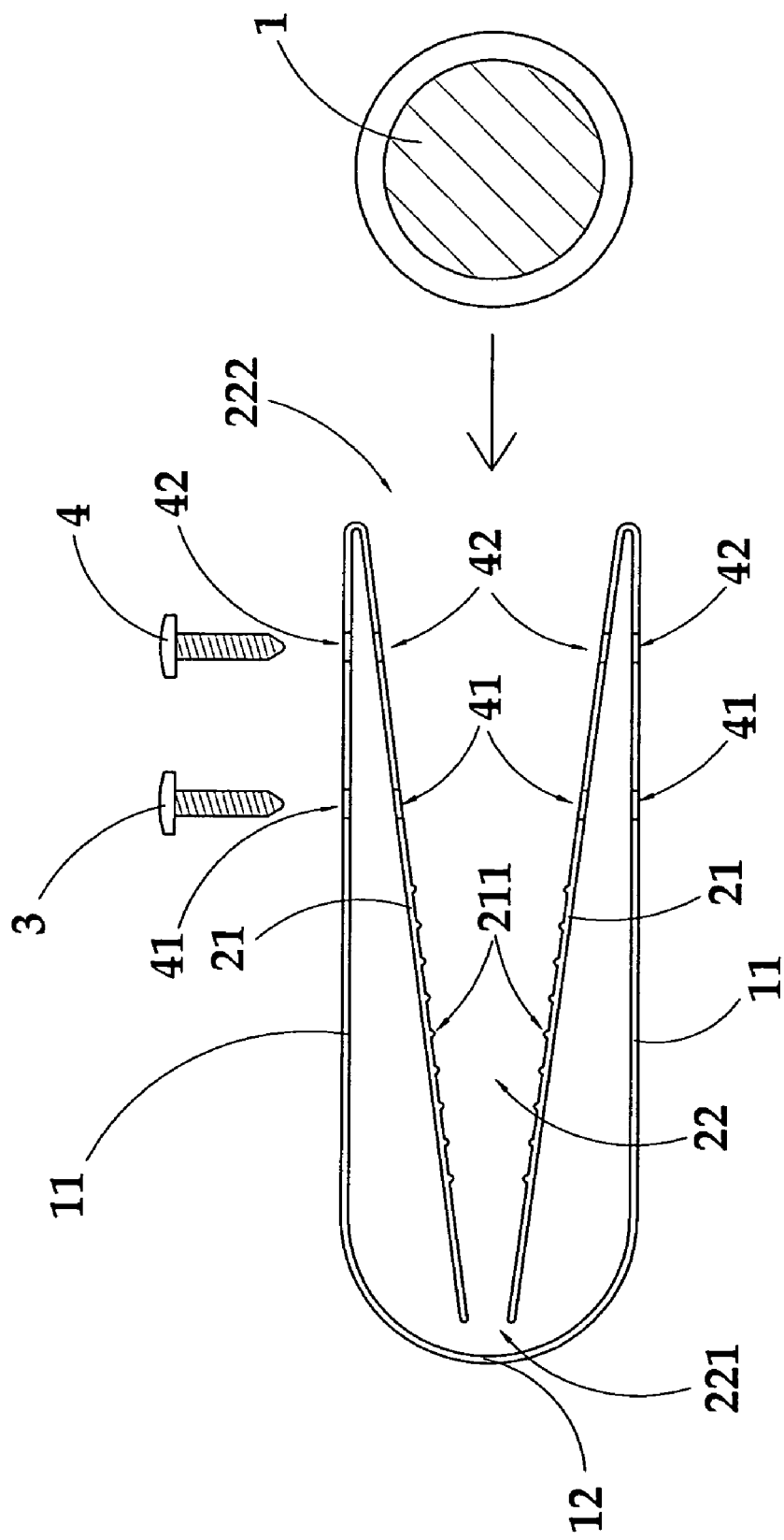
FIG. 2 is a sectional view of a self-secure mount according to the above preferred embodiment of the present invention.
Figure 3:
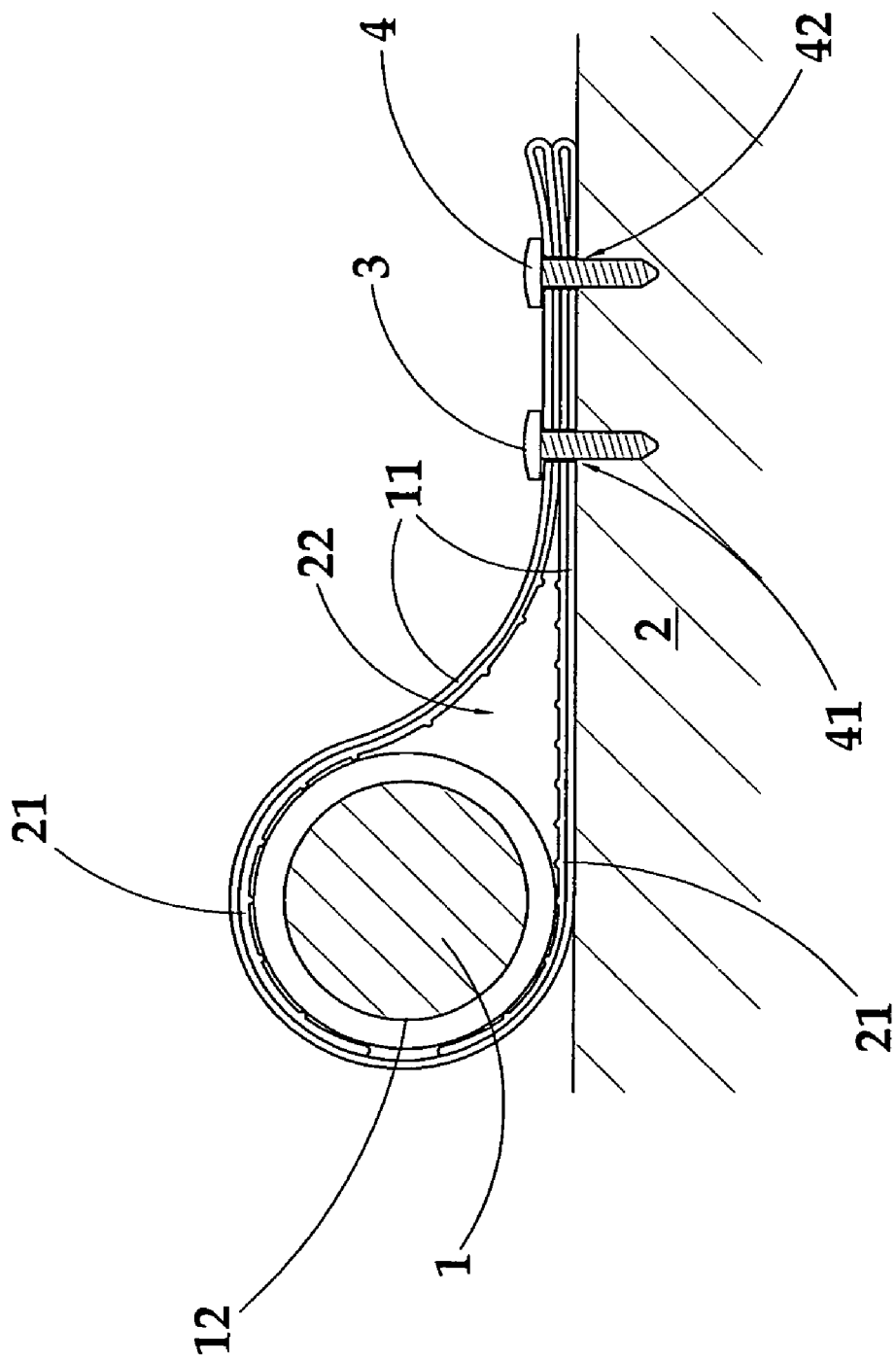
FIG. 3 is a sectional view of a self-secure mount according to the above preferred embodiment of the present invention, illustrating the tubular object being retained within the clipping channel.

Referring to FIGS. 1 to 3 of the drawings, a self-secure mount according to a preferred embodiment of the present invention is illustrated, wherein the self-secure mount, which is adapted for retaining a tubular object 1 in position, comprises an outer holder 10 and an inner holder 20.

The outer holder 10, which is made of flexible material, comprises two spaced apart holding panels 11 spacedly overlapping with each other, and an arc-shaped cornering panel 12 integrally extended between the two holding panels 11 for applying an elastic clipping force between the holding panels 11.

The inner holder 20, which is also made of flexible material, comprises two spaced apart clipping panels 21 overlapping with each other to define a clipping channel 22 between the holding panels 11 of the outer holder 10, wherein two outer edges of the clipping panels 21 are extended from two outer edges of the holding panels 11 while two inner edges of the clipping panels 21 are extended towards a closed end 221 of the clipping channel 22 within the cornering panel 12 of the outer holder 10.

The two inner edges of the clipping panels 21 are adapted for pressing against an outer surface of the tubular object 1 to retain the tubular object 1 in position, such that when the holding panels 11 are pressed to minimize a distance therebetween, the clipping force of the outer holder 10 is substantially increased towards the inner edges of the clipping panels 21 to hold the tubular object 1 within the cornering panel 12. It is worth to mention that when the holding panels 11 are pressed towards each other, the clipping panels 21 are driven to be pressed at the same time such that the resilient force is generated at the inner edges of the clipping panels 21 to retain the tubular object 1 in position. In addition, since the tubular object 1 is clipped between the clipping panels 21 by means of resilient force, the outer surface of the tubular object 1 will not be damaged.

Figure 4:
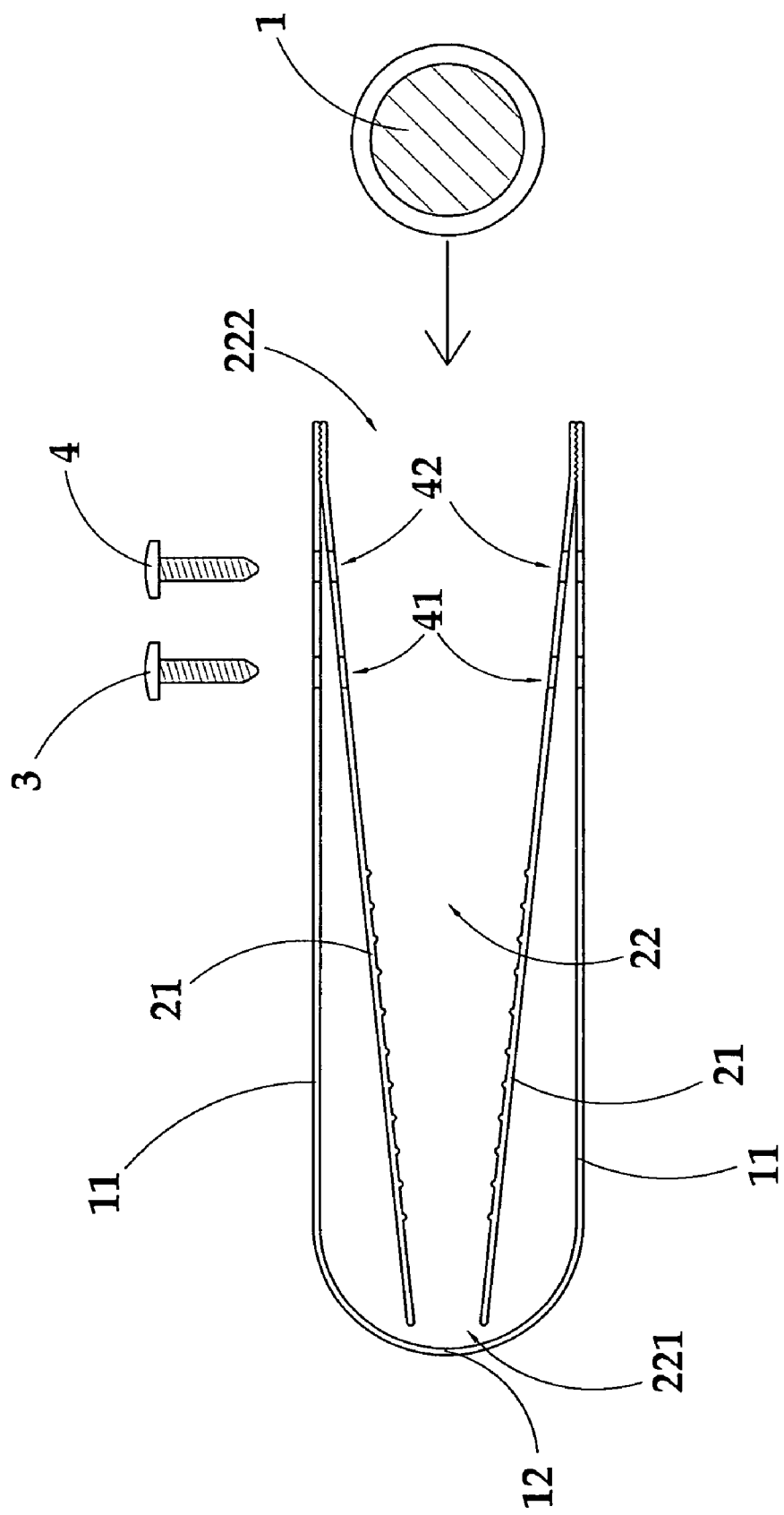
FIG. 4 illustrates a first alternative mode of the self-secure mount according to the above preferred embodiment of the present invention.
Figure 7:
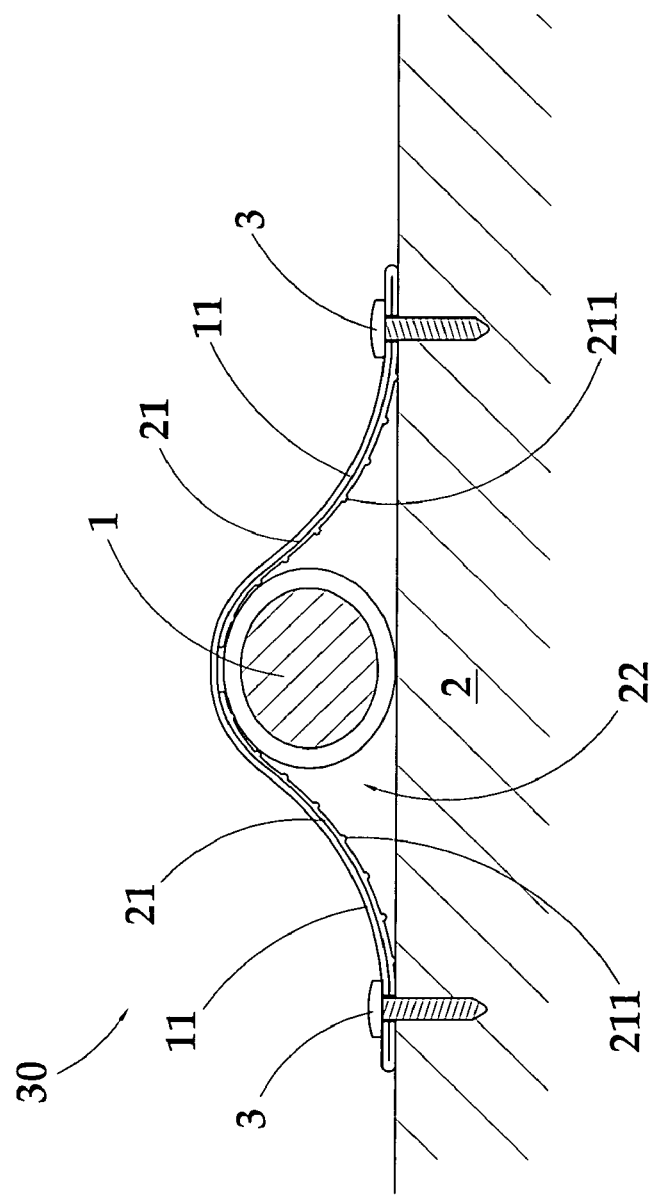
FIG. 7 illustrates an alternative use of the self-secure mount for a bigger tubular object according to the above preferred embodiment of the present invention.

According to the preferred embodiment, two outer edges of the clipping panels 21 are integrally extended from two outer edges of the holding panels 11 by bending an elongated metal plate 30 as shown in FIG. 7. Alternatively, the two outer edges of the clipping panels 21 are affixed to the two outer edges of the holding panels 11 by welding as shown in FIG. 4.

According to the preferred embodiment, the clipping channel 22 defines the closed end 221 at the cornering panel 12 and an opened end 222 at the outer edges of the clipping panels 21. A width of the clipping channel 22, which is a distance between the two clipping panels 21, is smaller than a diameter of the tubular object 1. Preferably, the width of the clipping channel 22 is gradually reducing from the opened end 222 to the closed end 221, as shown in FIG. 2.

The outer holder 10 is formed to have a U-shape that the two holding panels 11 are preferably extended in a parallel manner, wherein the cornering panel 12 is preferred to be formed in a U-shaped structure, as shown in FIG. 2.

Figure 5:
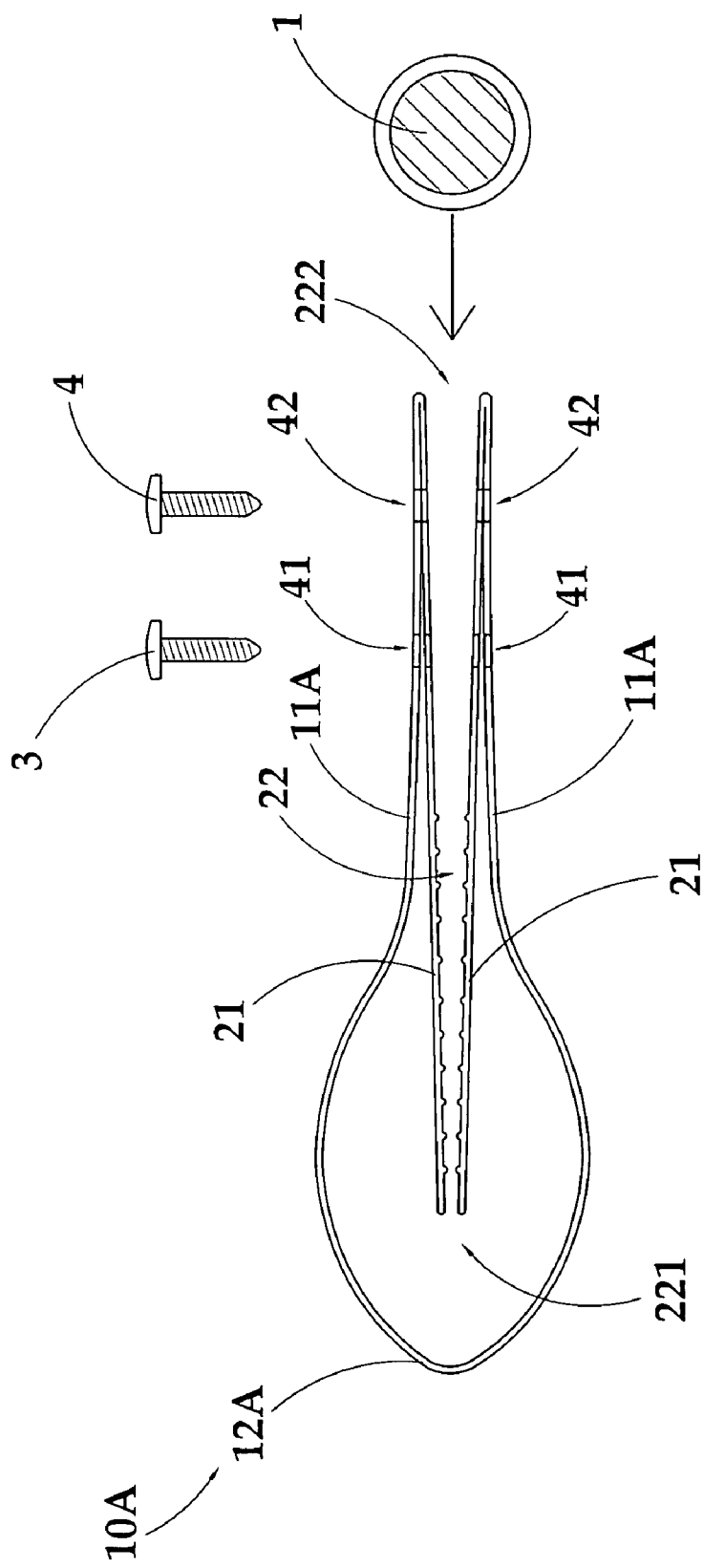
FIG. 5 illustrates a second alternative mode of the self-secure mount according to the above preferred embodiment of the present invention.
Figure 6:
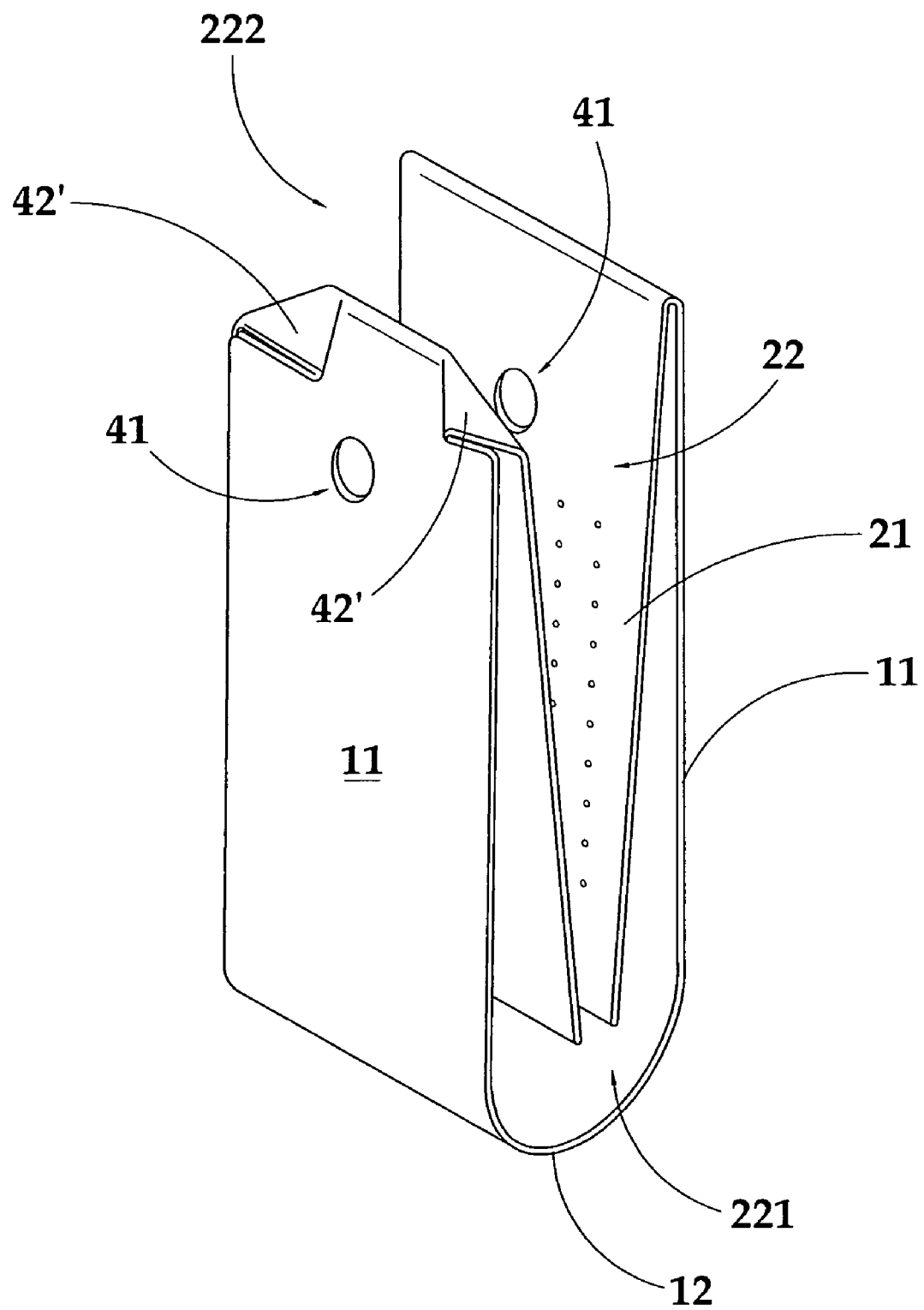
FIG. 6 illustrates a third alternative mode of the self-secure mount according to the above preferred embodiment of the present invention

Alternatively, the outer holder 10A is formed to have a "keyhole" shape that the two holding panels 11A are preferably extended in a parallel manner, wherein the cornering panel 12A is preferred to be formed in a non-circular structure. Preferably, the cornering panel 12A is formed to have an oval structure, as shown in FIG. 5.

Accordingly, the cornering panel 12 has a curvature smaller than a curvature of the tubular object 1. In other words, the curvature of the cornering panel 12 is the curvature of the inner wall of the closed end 221 of the clipping channel 22.

Each of the clipping panels 21 further has an inner frictional surface 211 for pressing on the outer surface of the tubular object 1 to retain the tubular object 1 in position when the holding panels 11 are pressed towards each other. Accordingly, a frictional layer can be applied on the inner friction surface 211 of each of the clipping panels 21 to enhance the friction thereof. Alternatively, a plurality of lugs are protruded from the clipping panels 21 to form the inner frictional surface 211, wherein the lug can be point shape, elongate shape or any other shape for friction enhancement.

Figure 9:
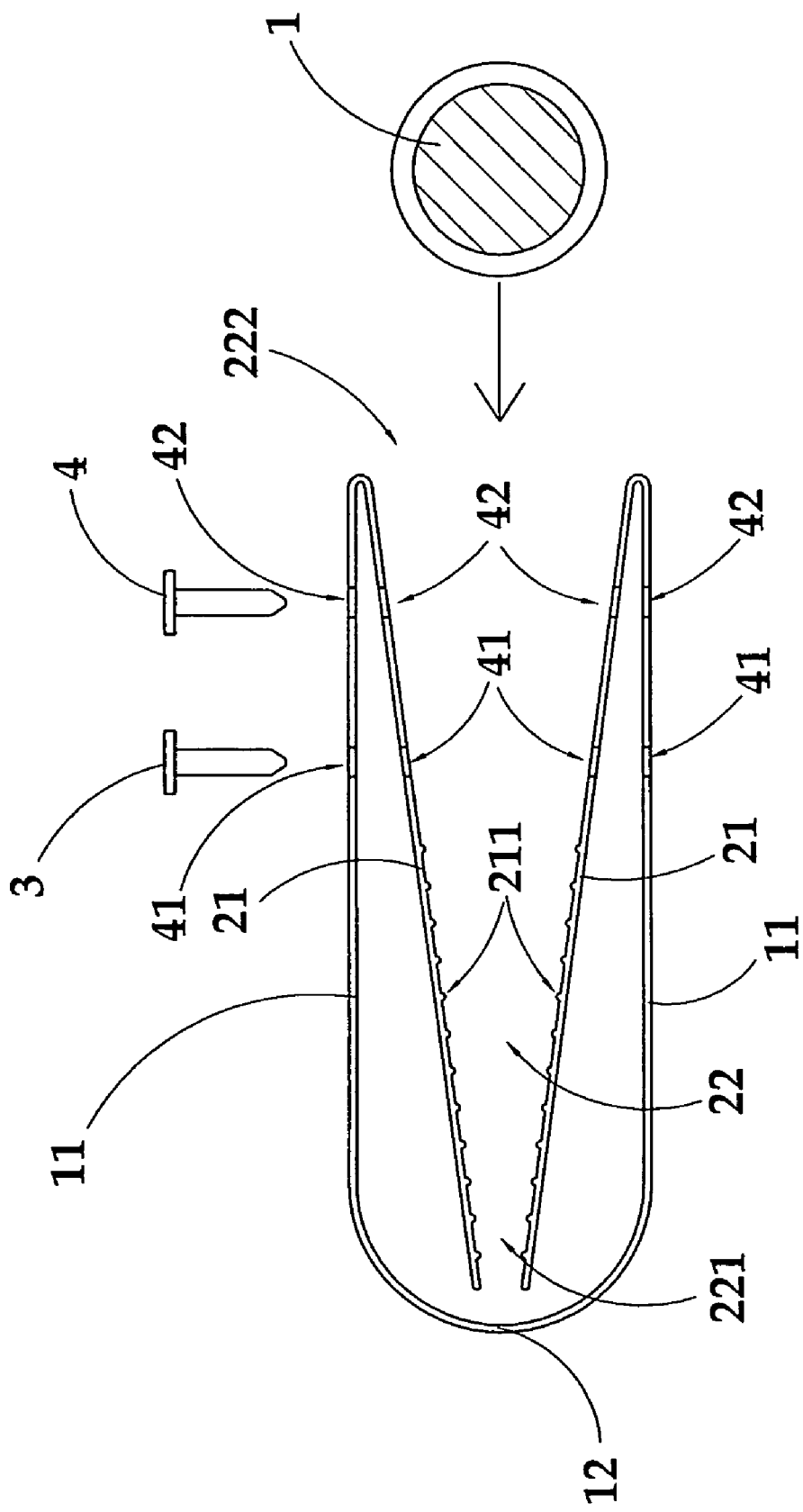
FIG. 9 is a sectional view of the forth alternative embodiment of the self-secure mount according to the above preferred embodiment of the present invention.
Figure 10:
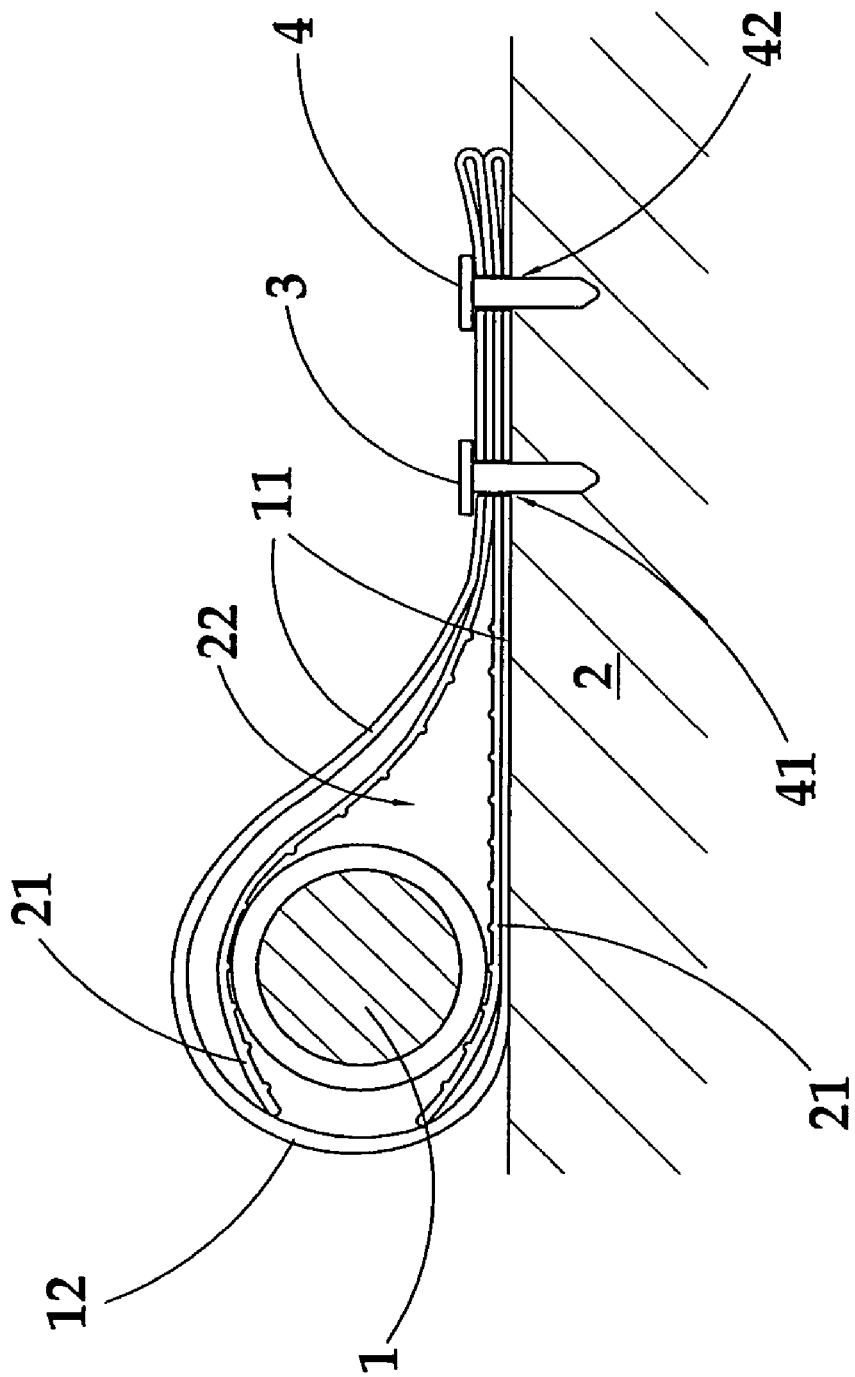
FIG. 10 is a sectional view of the forth alternative embodiment of the self-secure mount according to the above preferred embodiment of the present invention, illustrating the tubular object being retained within the clipping channel.

Alternatively, as illustrated in FIGS. 9 and 10, if the tubular object 1 has a relatively smaller diameter, and the curvature of the tubular object 1 is smaller than the curvature of the cornering panel 12, the clipping panels 21 can still apply enough pressure to retain the tubular object 1, because the cornering panel 12 restricts the position of the ends of the clipping panels 21, and the elastic force of the clipping panels 21 can retain the tubular object 1. In this manner, the self-secure mount can adapt to tubular objects with different sizes. Also, since the tubular object 1 is not directly attached to the cornering panel 12, and there is space between the inner holder 20 and the outer holder 10, the self-secure mount can absorb a mount of shock or movement at the same time.

Accordingly, the self-secure mount of the present invention is made of a one piece thin metal plate 30 having an elongated configuration.

In order to form the self-secure mount, the metal plate 30 is bent in a predetermined configuration. In particularly, as shown in FIG. 7, the method of manufacturing the self-secure mount of the present invention comprises the following steps.

(1) Provide then elongated thin metal plate 30 which is divided into four longitudinal sections, 31, 32, 33, 34.

(2) Overlappedly and spacedly fold two outer longitudinal sections 31, 34 on two inner longitudinal sections 32, 33 respectively.

(3) Overlappedly and spacedly fold the two outer longitudinal sections 31, 34 with each other at a position that the two outer longitudinal sections 31, 34 are overlappedly and spacedly sandwiched between the two inner longitudinal sections 32, 33 to form the clipping channel 22 between the two outer longitudinal sections 31, 34.

In other words, the two outer longitudinal sections 31, 34 forms the two clipping panels 21 respectively while the two inner longitudinal sections 32, 33 form the two holding panels 11.

Accordingly, in the step (2), when the two outer longitudinal sections 31, 34 on two inner longitudinal sections 32, 33 respectively, a gap must be formed between two edge ends of the outer longitudinal sections 31, 34. In other words, the edge ends of the outer longitudinal sections 31, 34 cannot be touched each other.

As shown in FIGS. 1 and 2, the self-secure mount further contains four mounting holes 41 provided on the holding panels 11 and the clipping panels 21 respectively, wherein the mounting holes 41 are aligned with each other for an elongated fastener passing therethrough to fix the outer and inner holders 10, 20 on a fixture 2 and to minimize the distance between the holding panels 11 at the same time. Accordingly, the elongated fastener can be a nail or a screw affixing to a wall surface of the fixture 2 through the mounting holes 41. Therefore, once the elongated fastener is affixed to the fixture 2, the holding panels 11 and the clipping panels 21 are pressed at the same time to retain the tubular object on the wall surface of the fixture 2, as shown in FIG. 3.

For better result, the self-secure mount further contains four retention holes 42 provided on the holding panels 11 and the clipping panels 21 respectively, wherein the retention holes 42 are spaced apart from the mounting holes 41 and are aligned with each other. Therefore, when two elongated fasteners are affixed to the fixture 2 through the mounting holes 41 and the retention holes 42, the self-secure mount of the present invention is securely affixed to the fixture 2 to prevent an unwanted movement of the outer and inner holders 10, 20 on the fixture 2.

Figure 8:
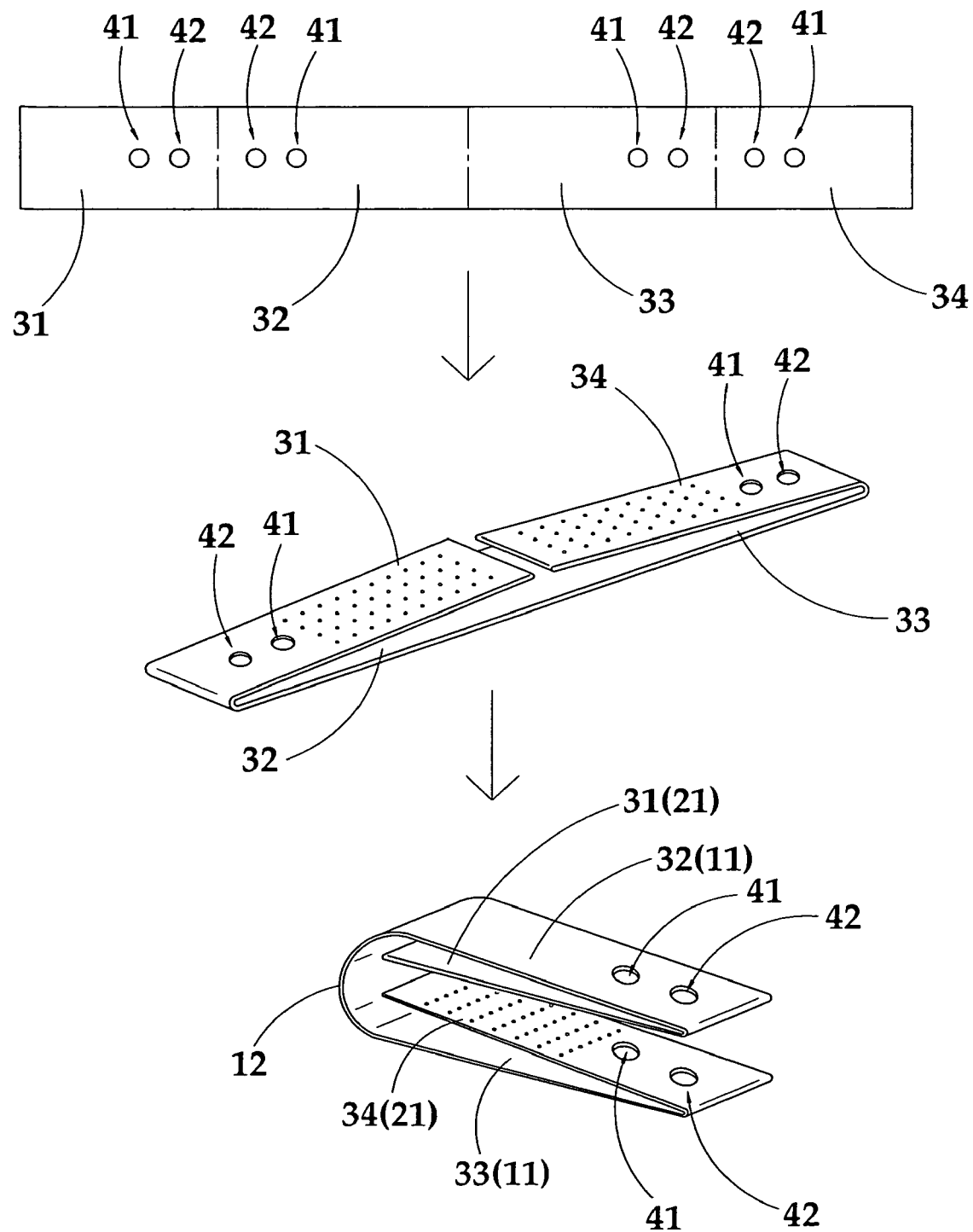
FIG. 8 is a flow diagram illustrating the manufacturing process of the self-secure mount according to the above preferred embodiment of the present invention.

Alternatively, two corner portions of one of the holding panels 11 are folded outwardly to form two sharp tips 42' for fixing on the fixture 2, as shown in FIG. 8. In other words, the two corresponding overlapped holding panel 11 and the clipping panel 21 are bent at the outer edges thereof to form the two sharp tips 42' as the substitution of the retention hole 42. Therefore, the self-secure mount of the present invention is securely affixed to the fixture 2 to prevent an unwanted movement of the outer and inner holders 10, 20 on the fixture 2 via the sharp tips 42' and the elongated fastener through the mounting holes 41. In other words, no retention hole 42 is formed.

According to the preferred embodiment, the self-secure mount of the present invention can be applied to mount different types of tubular objects 1 with different diameters. The distance between the clipping panels 21 is self-adjusted that the clipping panels 21 can press against the outer surface of the tubular object 1 when the tubular object 1 is slid along the clipping channel 22. In addition, two or more tubular objects 1 can be retained by the self-secure mount by sliding the tubular objects 1 along the clipping channel 22. The present invention can be used for telephone lines, power wires, and cables, including single-core, multiple-core, round lines, and flat lines. It can also be used for pipes, such as brass pipes, iron pipes, aluminum pipes, steel pipes, and other metal pipes, soft or hard plastic pipes, and rubber pipes.

In order to retain the tubular object 1 on the fixture 2 via the self-secure mount of the present invention, the user is able to perform the operation which comprises the following steps.

(A) Sliding the tubular object 1 towards the closed end 211 of the clipping channel 22 from the opened end 222 thereof.

(B) Retain the tubular object 1 at the two inner edges of the clipping panels 21 at a position closed to the cornering panel 12 of the outer holder 10. Therefore, the clipping panels 21 will apply the resilient force against the outer surface of the tubular object 1 at the inner edges of the clipping panels 21 to retain the tubular object 1 in position.

(C) Apply the pressing force at the two holding panels 11 of the outer holders 10. Once the distance between the holding panels 11 is minimized, the clipping force of the outer holder 10 is substantially increased towards the inner edges of the clipping panels 21 to hold the tubular object 1 within the cornering panel 12.

Accordingly, the pressing force can be applied by fixing the elongated fastener to the fixture 2 through the mounting holes 41. Another elongated fastener can be fixed to the fixture 2 through the retention holes 42 to prevent the unwanted movement of the self-secure mount on the fixture 2. Alternatively, the self-secure mount can be fixed on the fixture 2 to prevent the unwanted movement by fixing the sharp tips 42' on the fixture 2 so as to omit a second hole formed on the fixture 2 by the second elongated fastener through the retention holes 42.

For the tubular object 1 having a bigger diameter, the self-secure mount of the present invention can be bent in an alternative configuration to retain the tubular object 1 on the fixture 1, as shown in FIG. 7. The outer and inner holders 10, 20 are bent outwardly that the holding panels 11 are aligned at a planer direction and the clipping panels 21 are also aligned at a planer direction. The tubular object 1 is placed at the gap between the inner edges of the clipping panels 21 to align with the cornering panel 12 of the outer holder 10. Then, the inner frictional surfaces 211 are biased against the fixture 1 such that when the holding panels 11 are pressed towards the clipping panels 21 respectively by fixing the elongated fasteners through the mounting holes 41 on the fixture 2 respectively, the clipping panels 21 apply the resilient force against the tubular object 1 at the inner edges of the clipping panels 21 to retain the tubular object 1 on the fixture, as shown in FIG. 7.

Figure 11A:
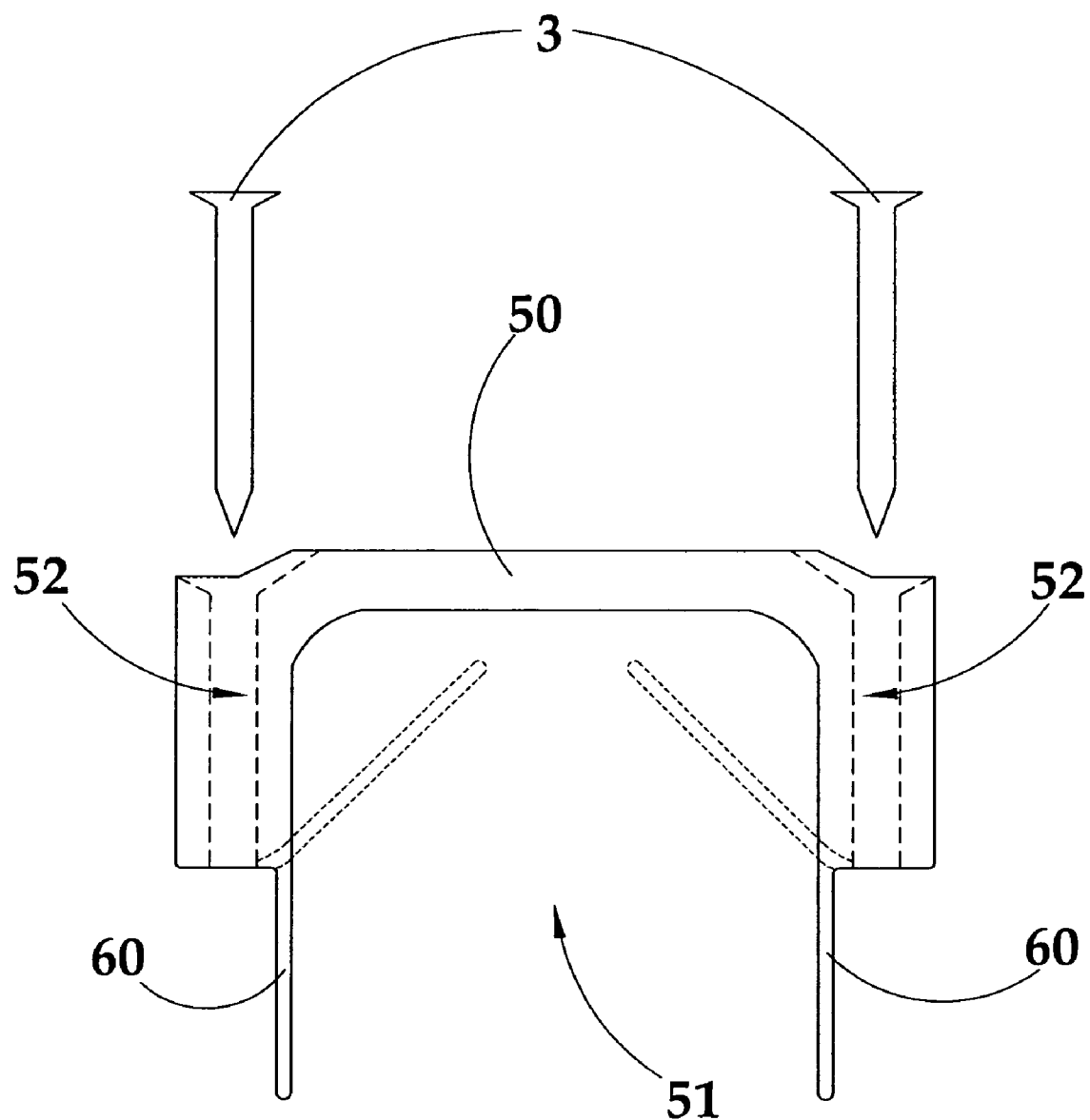
FIG. 11A is a side view of the fifth alternative embodiment of the self-secure mount.

Referring to FIGS. 11 to 12 of the drawings, in an alternative embodiment of the present invention, the outer holder 10 is a saddle 50, and the inner holder comprises two clipping panels 60. The saddle 50 is made of hard material. It provides a holding channel 51, so when the saddle 50 is mounted, it can cross over the tubular object 1 and with the tubular object 1 inside the holding channel 51. The cross section of the holding channel 51 is generally larger than the cross section of the tubular object 1 so the holding channel 51 won't press the tubular object 1 directly. The saddle 50 also has two holding holes 52 at the two sides of the saddle 50 with the holding channel 51 in between, so the saddle 50 can be mounted on a surface firmly with nails or bolts 3. Referring to FIG. 13, in an alternative embodiment, the saddle 50 only has one holding hole 52 and one clipping panel 60, so use one nail or bolt can mount the saddle 50 over a surface.

The saddle 50 can be made of plastic, wood, or metal. In an embodiment of the present invention, the saddle 50 is a piece of metal plate in Ω shape.

Figure 11B:
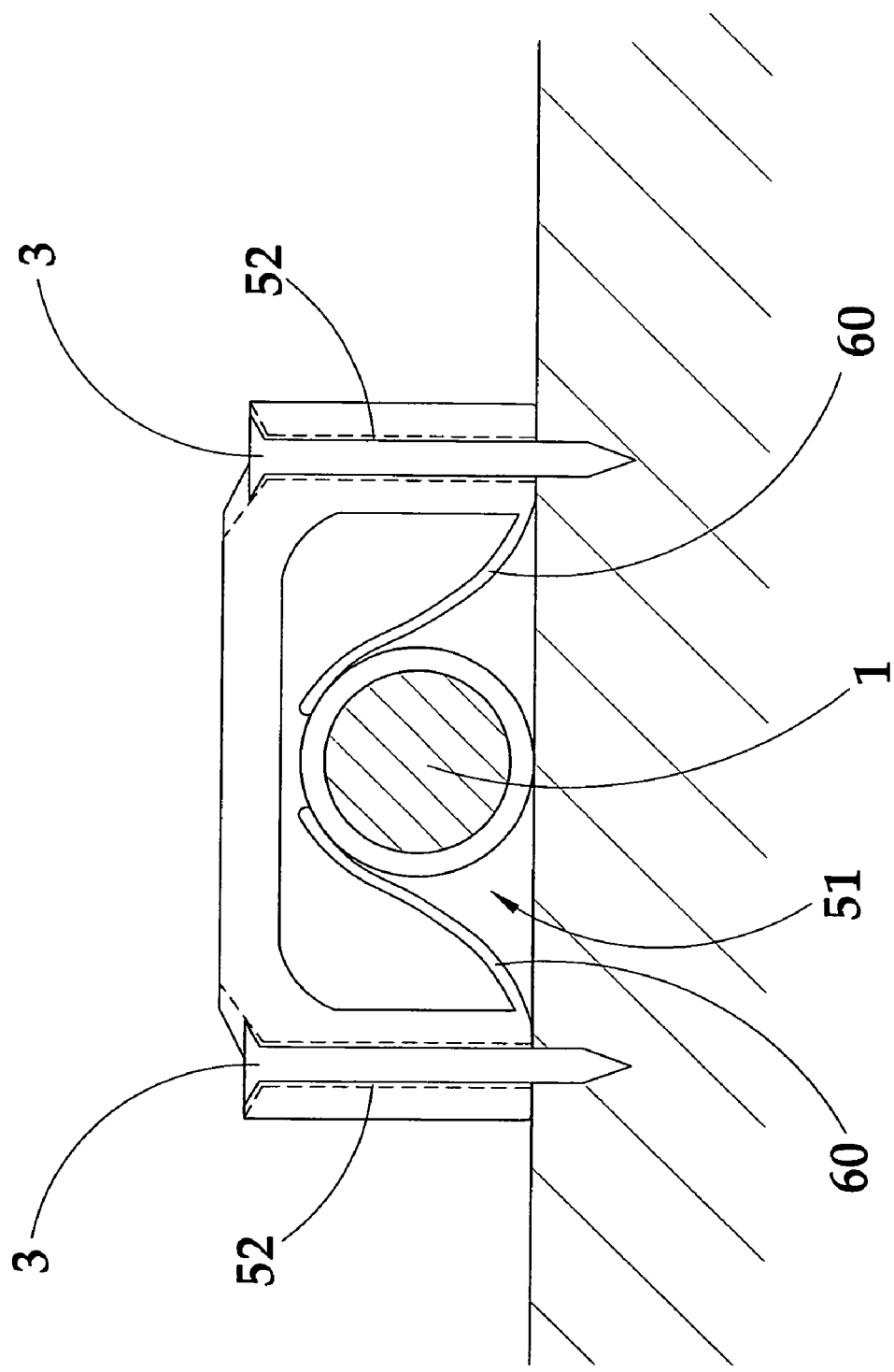
FIG. 11B is a side view of the fifth alternative embodiment of the self-secure mount, illustrating the tubular object being retained within the clipping channel.
Figure 12A:
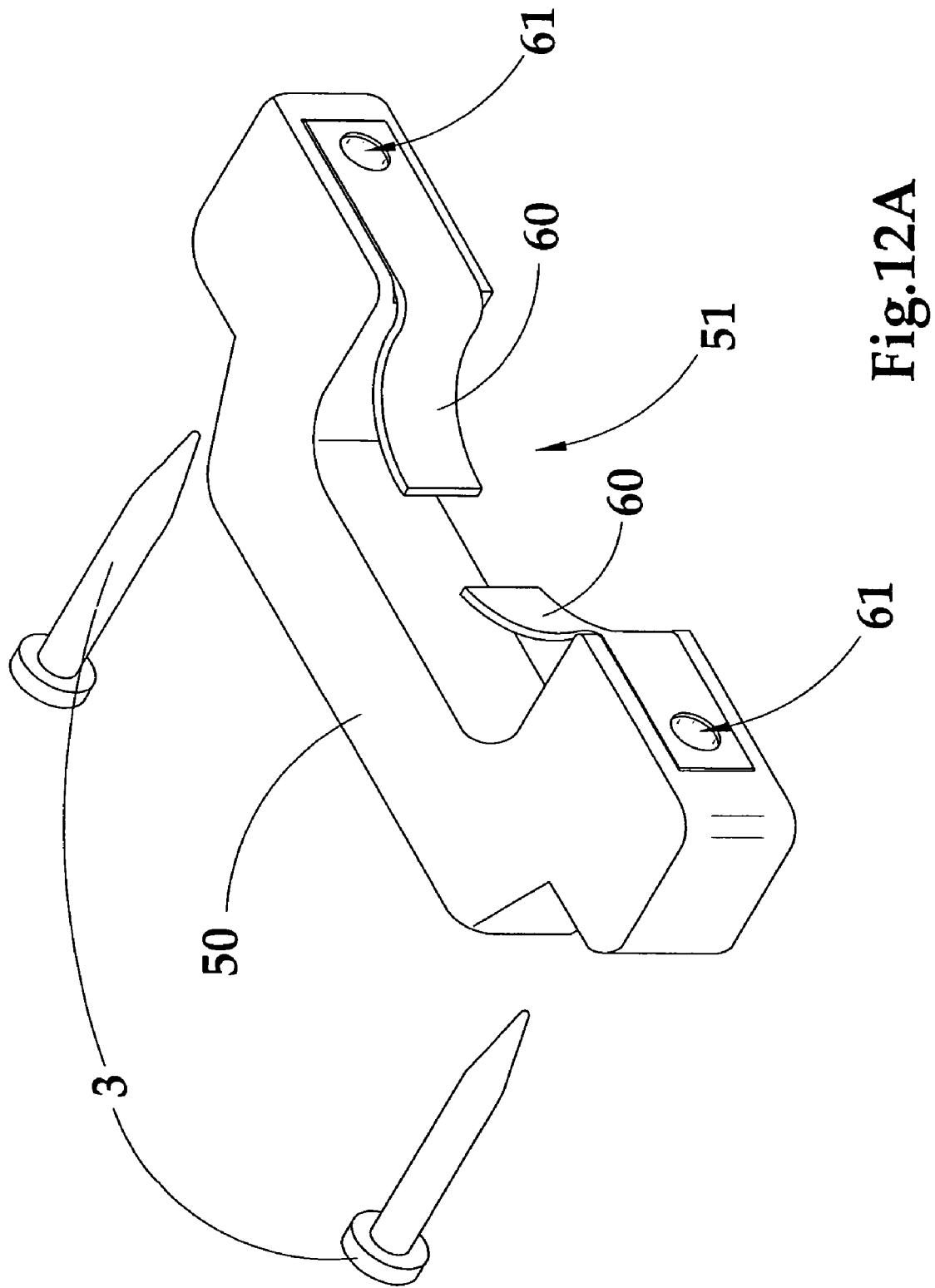
FIG. 12A is a perspective view of the sixth alternative embodiment of the self-secure mount.

The clipping panel 60 is made of flexible material. One end of the clipping panel 60 is fixed on the outer holder, and the other end extends into the holding channel 51 and suspends there. Referring to FIG. 11B, when the saddle 50 is crossed over the tubular object 1 on a mounting surface, the clipping panel 60 will directly press on the tubular object 1. As the nails or bolts fastening the saddle 50, the clipping panel 60 will press the tubular object 1 with elastic force.

There are several ways of fixing the clipping panel 60 on the outer holder in alternative embodiments. Referring to FIG. 12A, the clipping panel 60 is piece of elongated plate. One end of the plate has a mounting hole 61 corresponding to the mounting hole on the outer holder. When mounting the self-secure mount over a surface, the clipping panel 60 is placed between them with the mounting holes 61 being aligned. So the nail or bolt can fasten the clipping panel 60 and the outer hold together. At the same time, the other end of the clipping panel 60 is suspended inside the holding channel 51. This part of the clipping panel 60 can be pre-curved for retaining the tubular object 1.

Figure 12B:
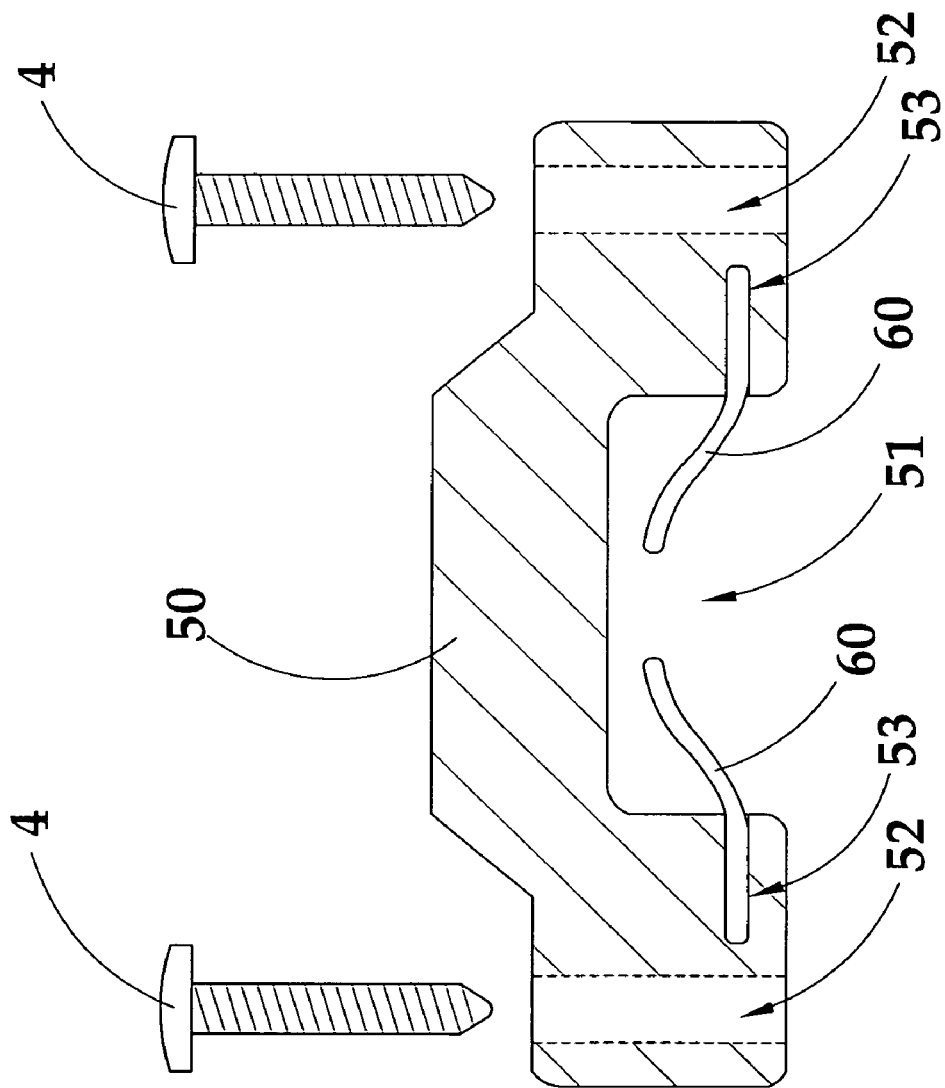
FIG. 12B is a side view of the seventh alternative embodiment of the self-secure mount.
Figure 13:
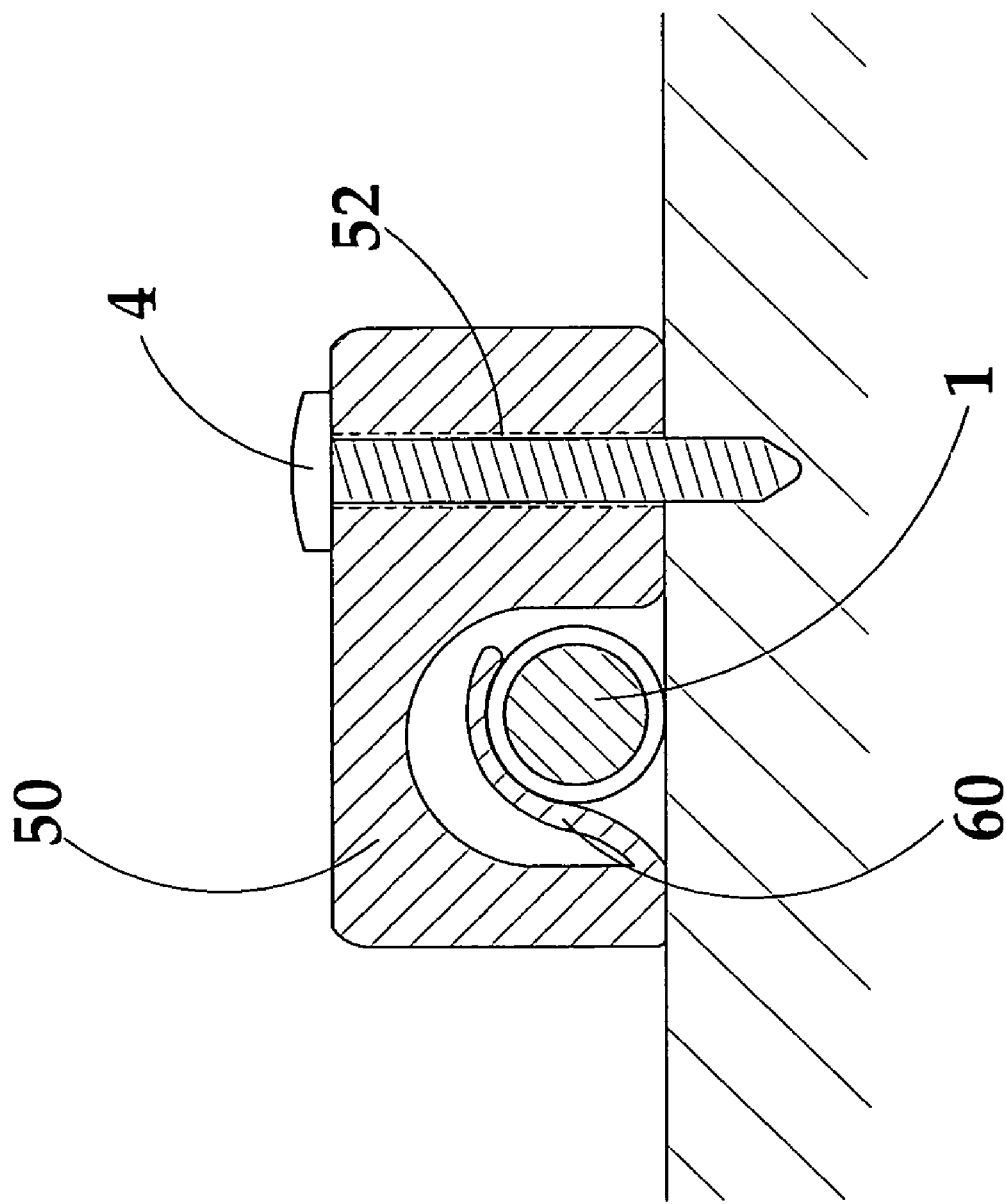
FIG. 13 is a side view of the eighth alternative embodiment of the self-secure mount, illustrating the tubular object being retained by one clipping panel.

Referring to FIG. 12B, in an alternative embodiment, the saddle 50 has one or two slots 53, so one end of the clipping panel 60 can be embedded into the slot 53 with the other end suspended in the control channel. Referring to FIG. 11A, in another alternative embodiment, the outer holder and the clipping panel 60 are made of plastic material and are originally mold together. Since the clipping panel 60 is much thinner to be flexible to provide elastic force. In another alternative embodiment, the saddle 50 is a piece of metal plate in Ω-shape. One end of the clipping panel 60 is folded in U-shape, so one end of the Ω-shaped metal plate can be embedded into this U-shape of the clipping panel 60. The other end of the clipping panel 60 is pre-curved and extends into the holding channel 51 from the bottom of the saddle 50. Two pieces of clipping panel 60 can be used in this embodiment. In another embodiment, the clipping panel 60 is an elongated plate which is pre-formed according to the contour of the outer hold, so the saddle 50 can be embedded into said clipping panel 60. At the same time, the two ends of the elongated plate extend into the holding channel 51 of the saddle 50 from the bottom.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A self-secure mount for tubular object, comprising:
   an outer holder for retaining said self-secure mount in position, providing a holding channel for said tubular object to pass wherethrough; and
   an inner holder, which is made of flexible material, comprising at least one clipping panel extending from said holding channel of said outer holder, wherein said clipping panel is adapted for pressing against an outer surface of said tubular object to retain said tubular object in position by elastic force;
   wherein said outer holder is made of flexible material, and comprises two spaced apart holding panels spacedly overlapping with each other, and an arc-shaped cornering panel integrally extended between said two holding panels for applying an elastic clipping force between said holding panels, wherein said inner holder comprises two spaced apart clipping panels overlapping with each other to define a clipping channel between said holding panels of said outer holder, wherein two outer edges of said clipping panels are extended from two outer edges of said holding panels while two inner edges of said clipping panels are extended towards a closed end of said clipping channel within said cornering panel of said outer holder, wherein said two inner edges of said clipping panels are adapted for pressing against an outer surface of said tubular object to retain said tubular object in position, such that when said holding panels are pressed to minimize a distance therebetween, said clipping force of said outer holder is substantially increased towards said inner edges of said clipping panels to hold said tubular object within said cornering panel.

2. The self-secure mount, as recited in claim 1, further containing four mounting holes provided on said holding panels and said clipping panels respectively, wherein said mounting holes are aligned with each other for an elongated fastener passing therethrough to fix said outer and inner holders on a fixture and to minimize the distance between said holding panels.

3. The self-secure mount, as recited in claim 2, further containing four retention holes provided on said holding panels and said clipping panels respectively, wherein said retention holes are spaced apart from said mounting holes and are aligned with each other for another elongated fastener passing therethrough to prevent an unwanted movement of said outer and inner holders on the fixture.

4. The self-secure mount, as recited in claim 3, wherein said cornering panel has a curvature smaller than a curvature of said tubular object.

5. The self-secure mount, as recited in claim 4, wherein said outer and inner holders are made of one piece thin metal plate.

6. The self-secure mount, as recited in claim 5, wherein each of said clipping panels further has an inner frictional surface for pressing on said outer surface of said tubular object to retain said tubular object in position when said holding panels are pressed towards each other.

7. The self-secure mount, as recited in claim 1, wherein said cornering panel has a curvature smaller than a curvature of said tubular object.

8. The self-secure mount, as recited in claim 1, wherein said outer and inner holders are made of one piece thin metal plate.

9. The self-secure mount, as recited in claim 1, wherein each of said clipping panels further has an inner frictional surface for pressing on said outer surface of said tubular object to retain said tubular object in position when said holding panels are pressed towards each other.

10. A method of manufacturing a self-secure mount, comprising the steps of:
   (a) providing an elongated thin metal plate which is divided into four longitudinal sections;
   (b) overlappedly and spacedly folding two outer longitudinal sections on two inner longitudinal sections respectively; and
   (c) overlappedly and spacedly folding said two outer longitudinal sections with each other at a position that said two outer longitudinal sections are overlappedly and spacedly sandwiched between said two inner longitudinal sections to form a clipping channel between said two outer longitudinal sections, wherein said two outer longitudinal sections form two clipping panels while said two inner longitudinal sections form two holding panels, wherein when a tubular object is slid into said clipping channel to a closed end thereof, two inner edges of said clipping panels are adapted for pressing against an outer surface of said tubular object to retain said tubular object in position, such that when said holding panels are pressed to minimize a distance therebetween, said clipping force of said holding panels is substantially increased towards said inner edges of said clipping panels to hold said tubular object within said closed end of said clipping channel.

11. The method as recited in claim 10 wherein, in the step (c), an inner wall of said closed end of said clipping channel has a curvature smaller than a curvature of said tubular object.

12. The method, as recited in claim 11, wherein the step (a) further comprises a step of pre-forming four mounting holes provided on said four longitudinal sections respectively, wherein said four mounting holes are aligned with each other when said thin metal plate is folded in the step (c).

13. The method, as recited in claim 10, wherein the step (a) further comprises a step of pre-forming four mounting holes provided on said four longitudinal sections respectively, wherein said four mounting holes are aligned with each other when said thin metal plate is folded in the step (c).

14. The method, as recited in claim 13, wherein the step (a) further comprises a step of pre-forming four retention holes provided on said four longitudinal sections respectively at a position that said retention holes are spaced apart from said mounting holes, wherein said four retention holes are aligned with each other when said thin metal plate is folded in the step (c).

15. The method, as recited in claim 13, wherein the step (a) further comprises a step of pre-forming four retention holes provided on said four longitudinal sections respectively at a position that said retention holes are spaced apart from said mounting holes, wherein said four retention holes are aligned with each other when said thin metal plate is folded in the step (c).

16. The method, as recited in claim 15, wherein each of said clipping panels further has an inner frictional surface for pressing on said outer surface of said tubular object to retain said tubular object in position when said holding panels are pressed towards each other.

17. The method, as recited in claim 10, wherein each of said clipping panels further has an inner frictional surface for pressing on said outer surface of said tubular object to retain said tubular object in position when said holding panels are pressed towards each other.

18. A method of retaining a tubular object via a self-secured mount which comprises an outer holder and an inner holder, comprising the steps of:
(a) sliding said tubular object towards a closed end of a clipping channel formed between two clipping panels of said inner holder, wherein said two clipping panels are spacedly overlapped with each other;
(b) retaining said tubular object at two inner edges of said clipping panels at a position closed to an arc-shaped cornering panel of said outer holder;
(c) applying a pressing force at two holding panels of said outer holders, wherein said two holding panels are integrally extended from said cornering panel and are spacedly overlapped with each other at a position that said two clipping panels are spacedly sandwiched between said two holding panels to define said closed end of said clipping channel at said cornering panel of said outer holder, such that when said holding panels are pressed to minimize a distance therebetween, a clipping force of said outer holder is substantially increased towards said inner edges of said clipping panels to hold said tubular object within said cornering panel; and
(d) fixing said outer and inner holders on a fixture to minimize the distance between said holding panels by fastening an elongated fastener on said fixture through four mounting holes, wherein said four mounting holes are provided on said holding panels and said clipping panels respectively and are aligned with each other.

19. A method of retaining a tubular object via a self-secured mount which comprises an outer holder and an inner holder, comprising the steps of:
(a) sliding said tubular object towards a closed end of a clipping channel formed between two clipping panels of said inner holder, wherein said two clipping panels are spacedly overlapped with each other;
(b) retaining said tubular object at two inner edges of said clipping panels at a position closed to an arc-shaped cornering panel of said outer holder;
(c) applying a pressing force at two holding panels of said outer holders, wherein said two holding panels are integrally extended from said cornering panel and are spacedly overlapped with each other at a position that said two clipping panels are spacedly sandwiched between said two holding panels to define said closed end of said clipping channel at said cornering panel of said outer holder, such that when said holding panels are pressed to minimize a distance therebetween, a clipping force of said outer holder is substantially increased towards said inner edges of said clipping panels to hold said tubular object within said cornering panel; and
(d) fixing said outer and inner holders on said fixture by fastening another elongated fastener on said fixture through four retention holes, wherein said four retention holes are provided on said holding panels and said clipping panels respectively, wherein said retention holes are spaced apart from said mounting holes and are aligned with each other.

* * * * *